G. W. PORTER & D. C. NOONAN.
KNOCKDOWN MOLDING APPARATUS.
APPLICATION FILED FEB. 23, 1918.
1,276,264.
Patented Aug. 20, 1918.
2 SHEETS—SHEET 2.
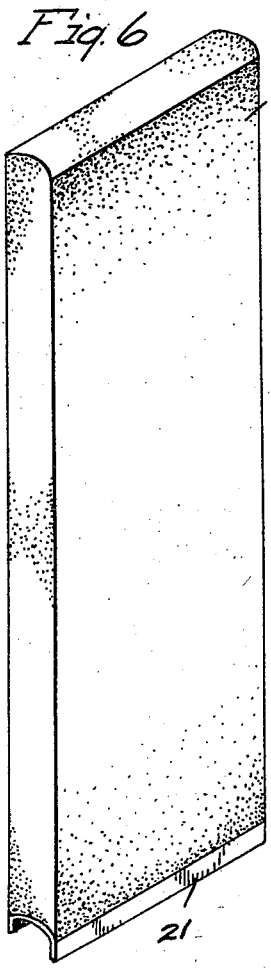
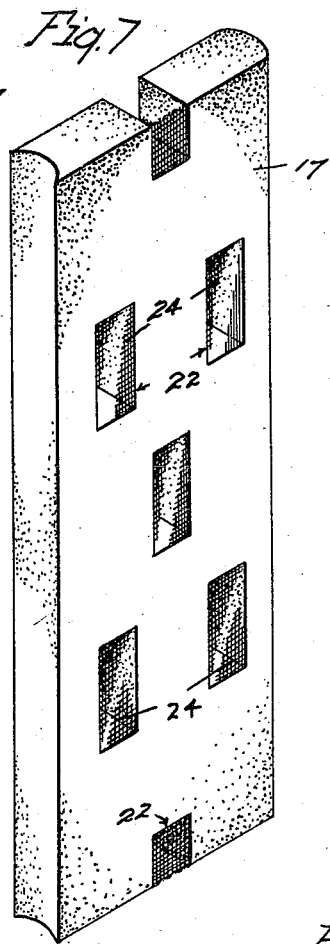
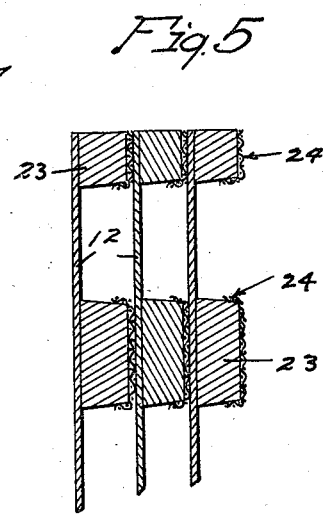
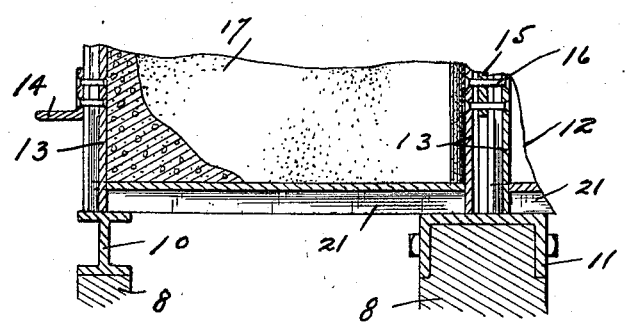
WITNESSES
E. G. Wells
H. H. Opsahl.
INVENTORS
G. W. PORTER
D. C. NOONAN
BY THEIR ATTORNEYS

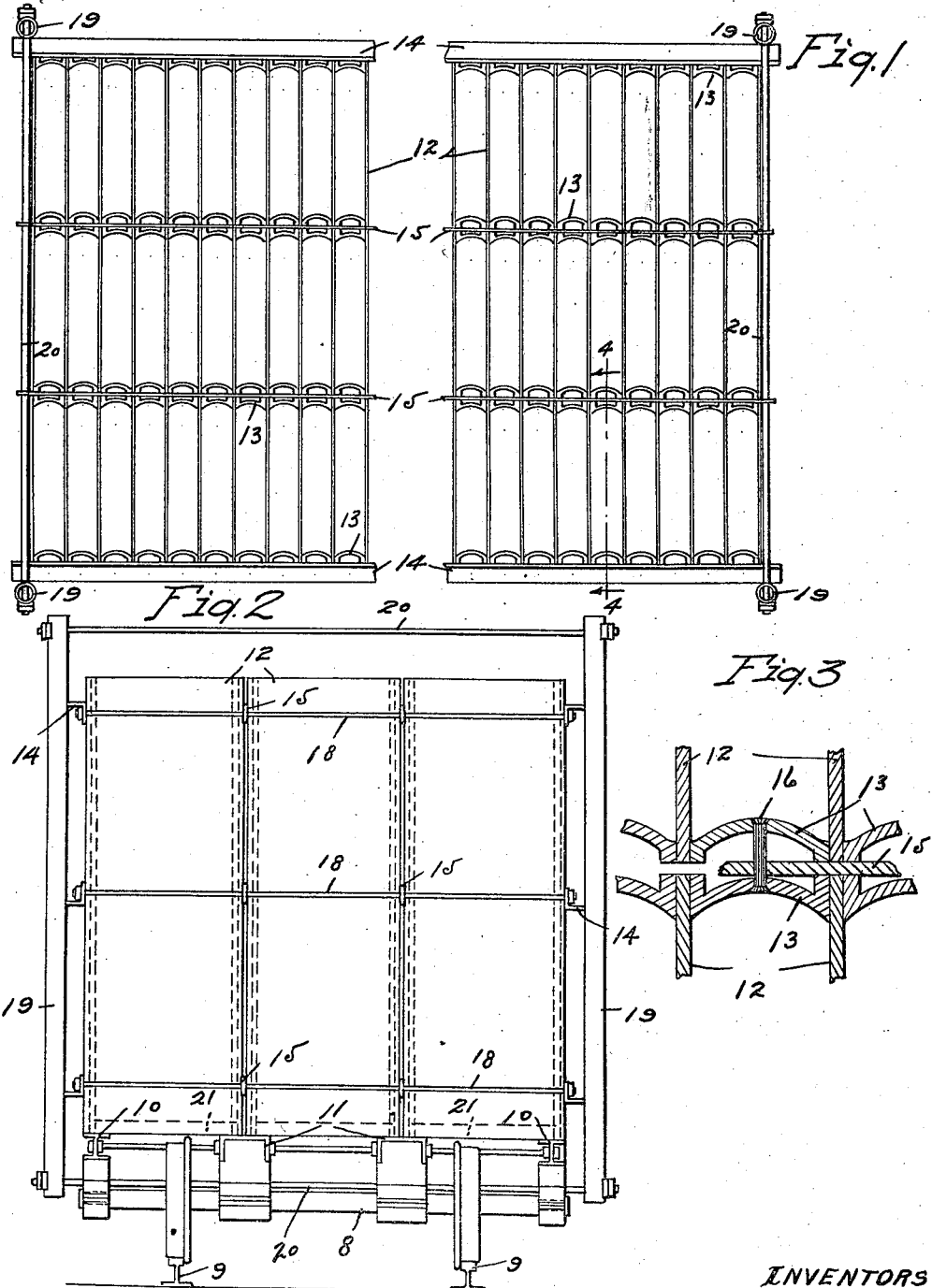

UNITED STATES PATENT OFFICE.

GEORGE W. PORTER, OF MINNEAPOLIS, MINNESOTA, AND DENNIS C. NOONAN, OF WATERTOWN, SOUTH DAKOTA.

KNOCKDOWN MOLDING APPARATUS.

1,276,264.

Specification of Letters Patent.

Patented Aug. 20, 1918.

Application filed February 23, 1918. Serial No. 218,675.

*To all whom it may concern:*

Be it known that we, GEORGE W. PORTER and DENNIS C. NOONAN, citizens of the United States, residing at Minneapolis, in the county of Hennepin and State of Minnesota, and Watertown, in the county of Codington and State of South Dakota, respectively, have invented certain new and useful Improvements in Knockdown Molding Apparatus; and we do hereby declare the following to be a full, clear, and exact description of the invention, such as will enable others skilled in the art to which it appertains to make and use the same.

Our invention has for its object to provide a knockdown molding apparatus, especially adapted for use in molding concrete planks to be used in the construction of buildings, silos, water tanks, grain bins, corn cribs, coal pockets, fences, culverts, and the like.

In forming concrete planks in hand molds, wherein dry tamped cement is used, it has been found, by reason of the contraction of the materials in drying and curing, and by reason of distortion caused by handling, that planks of irregular and uneven shapes are produced, causing a loss in material and making it difficult to erect structures requiring tight joints, or in any structure in which said product is used as a building material. It is also a slow and expensive process to cast or form planks in single hand molds.

Our knock-down apparatus has for its primary object to overcome these difficulties, and comprises a multiplicity of molds that may be progressively set up, to receive by a single operation a sufficient quantity of wet concrete to simultaneously fill all of the molds. Said apparatus may also be progressively taken down, to permit the removal of the formed planks, after the cement has set for a sufficient length of time to permit said planks to be removed without danger of breaking or warping. By the use of wet concrete the molds can be filled much more quickly than with dry tamped concrete, and, further, a larger stone aggregate can be used, thus greatly reducing the cost of the product both in labor and material.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:—

Figure 1 is a fragmentary plan view of the invention;

Fig. 2 is an end elevation of the same;

Fig. 3 is a fragmentary view in horizontal section of the mold forming side and end plates;

Fig. 4 is a fragmentary detail view in section taken on the line 4—4 of Fig. 1;

Fig. 5 is a view in section illustrating certain of the side plates having cores secured thereto;

Fig. 6 is a perspective view of one of the planks removed from the apparatus, as shown in Fig. 1, and supported on one of the pallets; and Fig. 7 is a perspective view of one of the planks formed in the apparatus when provided with side plates, as shown in Fig. 5.

The numeral 8 indicates a car arranged to run on a track 9 and having longitudinal outer sills 10 in the form of I-beams and parallel inverted intermediate channel beams 11. These beams 10 and 11 afford a bed on which the improved knock-down molding apparatus is supported.

As shown, the molding apparatus comprises a battery of molds arranged in three parallel rows which extend longitudinally in respect to the bed of the car 8. These molds are formed by a multiplicity of flat upright side plates 12, and a multiplicity of upright end plates 13. The end plates, at the sides of the apparatus, are rigidly secured by rivets or otherwise to the vertical flanges of top, bottom and intermediate angle tie-bars 14, and the intermediate end plates are rigidly secured to a like number of flat tie-bars 15, by rivets 16. The end plates 13 are secured to the tie-bars 14 and 15 in horizontally spaced relation to afford therebetween seats in which the vertical edges of the side plates 12 are removably mounted. Obviously, these seats hold the side plates 12 in proper laterally spaced relation to give the planks the required thickness, and, in turn, said side plates hold the end plates 13 properly spaced to give the planks the required width.

As shown, the end plates 13 are in the form of castings, and one thereof for each mold, is concave, while the other thereof is convex. A mold with these end plates produces a plank 17, as shown in Fig. 6, with concave and convex longitudinal edges, and when assembled with planks of like construction afford interlocking joints which permit said planks to be set on a straight line or on a curved line. By changing the shape of the end plates 13, planks with differently formed longitudinal edges may be produced. Also, by changing the side plates, planks with differently formed faces may be produced. For instance, if segmental planks are required, curved side plates may be substituted for the flat side plates.

It will be noted that the ends of the tie-bars 14 and 15 extend outward of the rows of end plates 13, and each horizontal set thereof is provided with alined perforations through which are inserted nut-equipped tie-rods 18. These tie-rods 18 hold the side and end plates in assembled relation on the bed of the car 8 and also hold the outermost side plates in position. Said outermost side plates are made somewhat heavier than the intermediate side plates to withstand the outward pressure of the wet concrete. To assist the tie-rods 18 in holding the side and end plates in assembled relation and also keep the apparatus in true upright position on the car, we provide a clamping frame at each end of said apparatus. Each of these frames consists of two upright tubular posts 19, having their ends connected by upper and lower nut-equipped tie-rods 20, the former of which extends over the top of the apparatus and the latter of which extends under the sills of the car.

Independent pallets 21 are provided for closing the bottoms of the molds and are loosely supported on the bed or sill of the car. These pallets 21 closely follow the contour of the molds, and, as shown, are preferably formed from inverted channel bars. In making planks for corn cribs, snow fences, and the like, each thereof is provided with a plurality of transverse openings 22, as shown in Fig. 7, by securing to the side plates cores 23, as shown in Fig. 5. When these planks are to be used in the construction of a corn crib the openings 22 are covered by gratings to keep out birds, rats or other animals. These gratings are preferably formed by wire mesh inserted between the cores and adjacent side plates with their edge portions bent upon the cores so as to be imbedded in the poured concrete and thereby secured in position. The gratings are indicated by the numeral 24, and in case concrete should enter the wire mesh between the cores and the side plates, the same may be easily removed after the planks have been removed from the molds.

From the above description it is evident that the molds may be progressively set up in position on the bed of the car, and all of the molds filled with wet concrete. The apparatus may then be moved on the track 9 to any desired position and left until the concrete sets sufficiently to warrant the handling of the planks without danger of breaking or otherwise damaging the same. To remove the planks from the apparatus the clamping frames 19—20 are first removed and then the tie-rods 18. Next the molds are progressively taken down to expose the planks and permit the operator to lift the same from the car on the couch 21, as shown in Fig. 6, and carried to any desired place where they are to remain until ready for use. Before the wet concrete is poured in the molds the side and end plates thereof are greased so that the concrete will not adhere thereto and thus make it difficult to remove the same. In place of mounting the apparatus on the bed or platform of a car, any other bed or platform may be used.

What we claim is:—

1. A knock-down apparatus for constructing a multiplicity of concrete planks, comprising a battery of rows of molds formed by a plurality of side and end plates, tie-bars connecting each group of end plates and holding the same spaced to afford seats for the side plates, and tie-rods extended through alined apertures in the tie-bars for holding the end and side plates in assembled relation.

2. A knock-down apparatus for constructing a multiplicity of concrete planks, comprising a battery of rows of molds formed by a plurality of side and end plates, tie-bars connecting each group of end plates and holding the same spaced to afford seats for the side plates, and tie-rods extended through alined apertures in the tie-bars for holding the end and side plates in assembled relation, and for holding the outermost side plates in position.

3. A knock-down apparatus for constructing a multiplicity of concrete planks, comprising a battery of rows of molds formed by a plurality of side and end plates, tie-bars connecting each group of end plates and holding the same spaced to afford seats for the side plates, tie-rods connecting opposite tie-bars for holding the end and side plates in assembled relation, and clamping frames embracing the apparatus.

4. A knock-down apparatus for constructing a multiplicity of concrete planks, comprising a battery of molds formed by a bed, a plurality of side and end plates removably supported on the bed, said end plates being connected in groups and spaced to afford seats for the side plates, and tie-rods for holding the end and side plates in assembled relation on the bed.

5. A knock-down apparatus for constructing a multiplicity of concrete planks, comprising a battery of molds formed by a bed, a plurality of side and end plates removably supported on the bed, said end plates being connected in groups and spaced to afford seats for the side plates, tie-rods for holding the end and side plates in assembled relation on the bed, and pallets closing the bottoms of the molds and removably supported on the bed.

6. A knock-down apparatus for constructing a multiplicity of concrete planks, comprising a battery of molds adapted to be progressively set up and progressively taken down, and pallets closing the bottoms of the molds, said pallets adapted to be supported above the bottoms of the molds to vary the length of the planks.

7. A knock-down apparatus for constructing a multiplicity of concrete planks, comprising a battery of molds formed by a plurality of side and end plates, said end plates being connected in groups and spaced to afford seats for the side plates, and cores rigidly secured to the side plates and removable therewith.

In testimony whereof we affix our signatures in presence of two witnesses.

GEORGE W. PORTER.

In the presence of—
CLARA DEMAREST,
HARRY D. KILGORE,

DENNIS C. NOONAN.

In the presence of—
W. J. NEARN,
LEONE FOY.

Copies of this patent may be obtained for five cents each, by addressing the "Commissioner of Patents, Washington, D. C."